United States Patent [19]

McCandlish et al.

[11] Patent Number: 4,705,619

[45] Date of Patent: Nov. 10, 1987

[54] HYDROPROCESSING WITH SELF-PROMOTED MOLYBDENUM AND TUNGSTEN SULFIDE CATALYST

[75] Inventors: Larry E. McCandlish, Highland Park; Teh C. Ho, Bridgewater, both of N.J.

[73] Assignee: Exxon Research and Engineering Company, Florham Park, N.J.

[21] Appl. No.: 7,765

[22] Filed: Jan. 28, 1987

Related U.S. Application Data

[60] Division of Ser. No. 687,579, Dec. 28, 1984, Pat. No. 4,663,023, which is a continuation-in-part of Ser. No. 595,991, Apr. 2, 1984, abandoned, which is a continuation of Ser. No. 454,386, Dec. 29, 1982, abandoned.

[51] Int. Cl.$^4$ .................... C10G 45/08; C10G 45/50; C10G 47/04; C10G 47/12

[52] U.S. Cl. .................................. 208/112; 208/215; 208/216 R; 208/143; 208/254 H; 208/251 H; 208/257; 208/264; 208/281

[58] Field of Search ............... 208/108, 112, 143, 215, 208/216 R, 251 H, 254 H, 257, 263, 264, 289; 502/219, 220, 221

[56] References Cited

U.S. PATENT DOCUMENTS

| | | | |
|---|---|---|---|
| 3,227,646 | 1/1966 | Jacobson et al. | 208/254 H |
| 4,243,553 | 1/1981 | Naumann et al. | 423/53 X |
| 4,243,554 | 1/1981 | Naumann et al. | 423/53 X |
| 4,457,836 | 7/1984 | Seiver | 208/289 |
| 4,483,762 | 11/1984 | Grosboll | 208/108 |
| 4,595,672 | 6/1986 | Ho et al. | 502/220 |

FOREIGN PATENT DOCUMENTS

| | | | |
|---|---|---|---|
| 0465579 | 5/1950 | Canada | 502/221 |
| 6118741 | 9/1981 | Japan | 502/220 |

*Primary Examiner*—Andrew Metz
*Assistant Examiner*—Helane Myers
*Attorney, Agent, or Firm*—Joseph J. Dvorak

[57] ABSTRACT

Hydrocarbon feeds are upgraded by contacting same, at elevated temperature and in the presence of hydrogen, with a self-promoted catalyst prepared by heating one or more water soluble catalyst precursors in a non-oxidizing atmosphere in the presence of sulfur at a temperature of at least about 200° C. The precursors will be one or more compounds of the formula $ML(Mo_yW_{1-y}O_4)$ wherein M is one or more promoter metals selected from the group consisting essentially of Mn, Fe, Co, Ni, Cu, Zn and mixtures thereof, wherein $0 \leq y \leq 1$ and wherein L is a nitrogen containing, neutral multidentate, chelating ligand. In a preferred embodiment the ligand L will comprise one or more chelating alkyl di or triamines and the non-oxidizing atmosphere and to form the catalyst will comprise $H_2S$.

15 Claims, No Drawings

HYDROPROCESSING WITH SELF-PROMOTED MOLYBDENUM AND TUNGSTEN SULFIDE CATALYST

CROSS REFERENCE TO RELATED APPLICATIONS

Rule 60 divisional of U.S. Ser. No. 687,579, filed Dec. 28, 1984 now U.S. Pat. No. 4,663,023 continuation-in-part of U.S. Ser. No. 595,991, filed Apr. 2, 1984 now abandoned which is a Rule 60 continuation of now-abandoned U.S. Ser. No. 454,386 filed on Dec. 29, 1982.

BACKGROUND OF THE INVENTION

1. Field of the Invention

This invention relates to hydrotreating processes using self-promoted molybdenum and tungsten sulfide catalysts. More particularly, this invention relates to hydrotreating processes using self-promoted molybdenum and tungsten sulfide hydrotreating catalysts produced by heating one or more water soluble molybdate and/or tungstate catalyst precursors containing the promoter metal as part of the precursor molecule in the presence of sulfur at elevated temperature for a time sufficient to form said catalyst.

2. Background of the Disclosure

The petroleum industry is increasingly turning to coal, tar sands, heavy crudes and resids as sources for future feed stocks. Feedstocks derived from these heavy materials contain more sulfur and nitrogen than feedstocks derived from more conventional crude oils. Such feedstocks are commonly referred to as being dirty feeds. These feeds therefore require a considerable amount of upgrading in order to obtain usable products therefrom, such upgrading or refining generally being accomplished by hydrotreating processes which are well-known in the industry.

These processes require the treating with hydrogen of various hydrocarbon fractions, or whole heavy feeds, or feedstocks, in the presence of hydrotreating catalysts to effect conversion of at least a portion of the feed, or feedstock to lower molecular weight hydrocarbons, or to effect the removal of unwanted components, or compounds, or their conversion to innocuous or less undesirable compounds. Hydrotreating may be applied to a variety of feedstocks, e.g., solvents, light, middle, or heavy distillate feeds and residual feeds, or fuels. In hydrotreating relatively light feeds, the feeds are treated with hydrogen, often to improve odor, color, stability, combustion characteristics, and the like. Unsaturated hydrocarbons are hydrogenated, and saturated. Sulfur and nitrogen are removed in such treatments. In the treatment of catalytic cracking feedstocks, the cracking quality of the feedstock is improved primarily by the removal of nitrogen and hydrogenation. Carbon yield is reduced, and gasoline yield is generally increased. In the hydrodesulfurization of heavier feedstocks, or residua, the sulfur compounds are hydrogenated and cracked. Carbon-sulfur bonds are broken, and the sulfur for the most part is converted to hydrogen sulfide which is removed as a gas from the process. Hydrodenitrogenation, to some degree also generally accompanies hydrodesulfurization reactions. In the hydrodenitrogenation of heavier feedstocks, or residua, the nitrogen compounds are hydrogenated and cracked. Carbon-nitrogen bonds are broken, and the nitrogen is converted to ammonia and evolved from the process. Hydrodesulfurization, to some degree also generally accompanies hydrodenitrogenation reactions. In the hydrodesulfurization of relatively heavy feedstocks, emphasis is on the removal of sulfur from the feedstock. In the hydrodenitrogenation of relatively heavy feedstocks emphasis is on the removal of nitrogen from the feedstock. Albeit, although hydrodesulfurization and hydrodenitrogenation reactions generally occur together, it is usually far more difficult to achieve effective hydrodenitrogenation of feedstocks than hydrodesulfurization of feedstocks.

Catalysts most commonly used for these hydrotreating reactions include materials such as cobalt molybdate on alumina, nickel on alumina, cobalt molybdate promoted with nickel, nickel tungstate, etc. Also, it is well-known to those skilled in the art to use certain transition metal sulfides such as cobalt and molybdenum sulfides and mixtures thereof to upgrade oils containing sulfur and nitrogen compounds by catalytically removing such compounds in the presence of hydrogen, which processes are collectively known as hydrotreating or hydrorefining processes, it being understood that hydrorefining also includes some hydrogenation of aromatic and unsaturated aliphatic hydrocarbons. Thus, U.S. Pat. No. 2,914,462 discloses the use of molybdenum sulfide for hydrodesulfurizing gas oil and U.S. Pat. No. 3,148,135 discloses the use of molybdenum sulfide for hydrorefining sulfur and nitrogen-containing hydrocarbon oils. U.S. Pat. No. 2,715,603, discloses the use of molybdenum sulfide as a catalyst for the hydrogenation of heavy oils, while U.S. Pat. No. 3,074,783 discloses the use of molybdenum sulfides for producing sulfur-free hydrogen and carbon dioxide, wherein the molybdenum sulfide converts carbonyl sulfide to hydrogen sulfide. Molybdenum and tungsten sulfides have other uses as catalysts, including hydrogenation, methanation, water gas shift, etc. reactions.

In general, with molybdenum and other transition metal sulfide catalysts as well as with other types of catalysts, higher catalyst surface areas generally result in more active catalysts than similar catalysts with lower surface areas. Thus, those skilled in the art are constantly trying to achieve catalysts that have higher surface areas. More recently, it has been disclosed in U.S. Pat. Nos. 4,243,553, and 4,243,554 that molybdenum sulfide catalysts of relatively high surface area may be obtained by thermally decomposing selected thiomolybdate salts at temperatures ranging from 300°–800° C. in the presence of essentially inert, oxygen-free atmospheres. Suitable atmospheres are disclosed as consisting of argon, a vacuum, nitrogen and hydrogen. In U.S. Pat. No. 4,243,554 an ammonium thiomolybdate salt is decomposed at a rate in excess of 15° C. per minute, whereas in U.S. Pat. No. 4,243,553, a substituted ammonium thiomolybdate salt is thermally decomposed at a very slow heating rate of from about 0.5° to 2° C./min. The processes disclosed in these patents are claimed to produce molybdenum disulfide catalysts having superior properties for water gas shift and methanation reactions and for catalyzed hydrogenation or hydrotreating reactions.

SUMMARY OF THE INVENTION

This invention relates to hydroprocessing processes comprising contacting a hydrocarbon feed, at elevated temperature and in the presence of hydrogen, with a self promoted catalyst obtained by heating one or more water soluble catalyst precursors of the formula $ML(Mo_yW_{1-y}O_4)$ in a non-oxidizing atmosphere in the presence of sulfur at a temperature of at least about 200° C. for a time sufficient to form said catalyst, wherein M comprises one or more divalent promoter metals selected from the group consisting essentially of Mn, Fe, Co, Ni, Cu, Zn and mixtures thereof, wherein y is any value ranging from 0 to 1, and wherein L is one or more, neutral, nitrogen-containing ligands at least one of which is a chelating polydentate ligand. In a preferred embodiment M will be selected from the group consisting of (a) Fe, Co, Ni and mixtures thereof and (b) mixtures of (a) with Mn, Cu, Zn and mixtures thereof. In a particularly preferred embodiment ligand L will have a denticity of six and will be either three bidentate or two tridentate chelating alkyl amine ligands, M will be selected from the group consisting essentially of Ni, Fe, Co and mixtures thereof and the non-oxidizing atmosphere will contain hydrogen sulfide as the source of sulfur.

Hydroprocessing is meant to include any process that is carried out in the presence of hydrogen, including, but not limited to, hydrocracking, hydrodenitrogenation, hydrodesulfurization, hydrogenation of aromatic and aliphatic unsaturated hydrocarbons, methanation, water gas shift, etc. These reactions include hydrotreating and hydrorefining reactions, the difference generally being thought of as more of a difference in degree than in kind, with hydrotreating conditions being more severe than hydrorefining conditions. Some of the catalysts of this invention have hydrotreating or hydrorefining activities substantially greater than that of conventional hydrotreating catalysts such as cobalt molybdate on alumina.

The catalysts of this invention may be used in bulk form or supported on a suitable inorganic refractory oxide support such as alumina. A particularly significant advantage of this invention is that the water solubility of the catalyst precursor permits the precursor to be impregnated onto a suitable support, such as alumina, via conventional impregnation techniques such as incipient wetness and adsorption.

DETAILED DESCRIPTION OF THE INVENTION

As hereinbefore stated, the catalyst precursor is a water soluble metallate having the formula $ML(Mo_yW_{1-y}O_4)$ wherein M is one or more divalent promoter metals selected from the group consisting of Mn, Fe, Co, Ni, Cu, Zn and mixtures thereof. Preferably M will be selected from the group consisting of (a) Ni, Co, Fe and mixtures thereof and (b) mixtures of (a) with Zn, Cu, Mn and mixtures thereof. Still more preferably M will be selected from the group consisting of Fe, Ni, Co and mixtures thereof. Thus, the promoter metal may be a single metal such as Ni in which case the precursor will have the formula $(NiL)(Mo_yW_{1-y}O_4)$. Alternatively the promoter metal may be a mixture of two, three, four, five or even six promoter metals. For the case of two promoter metals, such as Ni and Co, the precursor will have the formula $[(Ni_aCo_{1-a})L](Mo_yW_{1-y}O_4)$ wherein $0<a<1$. In the case of three promoter metals such as Ni, Co and Zn, the precursor will have the formula of the form $[(Ni_aCo_bZn_c)L](Mo_yW_{1-y}O_4)$ wherein $0<a$, b or $c<1$ and $a+b+c=1$. Where there are four metals such as Fe, Ni, Co and Zn, the precursor will have the formula $[(Fe_aNi_bCo_cZn_d)L](Mo_yW_{1-y}O_4)$ wherein $0<a$, b, c, or $d<1$ and $a+b+c+d=1$, and so on. The precursor may be a self promoted molybdate, tungstate or combination thereof. If it is only a molybdate it is obvious that y will have a value of 1. Alternatively, if the precursor is a tungstate y will be zero.

The ligand L, will generally have a denticity of six and will be one or more neutral, nitrogen containing ligands wherein at least one of said ligands is a multidentate chelating ligand which chelates the promoter metal cation to form a chelated promoter metal cation $[ML]^{2+}$. Thus, the catalytic metal oxide anion $(Mo_yW_{1-y}O_4)^{2-}$ will be ionically bound to the chelated promoter metal cation $[ML]^{2+}$. By neutral is meant that the ligand itself does not have a charge.

Those skilled in the art know that the term "ligand" is used to designate functional coordinating groups which have one or more pairs of electrons available for the formation of coordinate bonds. Ligands that can form more than one bond with a metal ion are called polydentate while ligands that can form only one bond with a metal ion are called monodentate. Monodentate ligands are not capable of forming chelates. Hence, if one uses one or more species of monodentate ligands in the precursor molecule, then one must also use at least one polydentate chelating ligand. Preferably L will be one or more polydentate chelating Ligands. The denticity of the ligand L will generally be six, because the promoter metal cations prefer six-fold coordination. Hence, if more than one species of ligand is employed in the precursor molecule, the denticity of the ligand species will usually add up to six. It should be understood that it is possible for ligand L to have a total denticity of less than six, but in most cases L will have a total denticity of six. Thus L will be three bidentate ligands, two tridentate ligands a mixture of a bidentate and a quadridentate ligand, a hexadentate ligand or a mixture of a polydentate ligand with monodentate ligands as long as the combination has a total denticity of six. As has heretofor been stated, it is preferred to use chelating bidentate and tridentate ligands. In general, the ligands useful in this invention include alkyl and aryl amines and nitrogen heterocylces. Illustrative but non-limiting examples of ligands useful in the catalyst precursors of this invention are set forth below.

Monodentate ligands will include NH3 as well as alkyl and aryl amines such as ethyl amine, dimethyl amine, pyrideine, etc. Useful chelating bidentate amine ligands are illustrated by ethylenediamine, 2,2'-bipyridine, 1,10-phenylene bis(dimethyl-amine), o-phenylene diamine, tetramethylethylenediamine and propane-1,3 diamine. Similarly, useful chelating tridentate amine ligands are represented by terpyridine and diethylenetriamine while triethylenetetramine is illustrative of a useful chelating quadradentate amine ligand. Useful chelating pentadentate ligands include tetraethylenepentamine while sepulchrate (an octazacryptate) is illustrative of a suitable chelating hexadentate ligand. As a practical matter it will be preferred to use chelating, polydentate alkyl amines for L. Illustrative, but not limiting examples of alkyl amines that are useful in the catalyst precursor of this invention include ethylenediamine, diethylenetriamine, and tetraethylenetetramine. It is particularly preferred to use bidentate and tridentate alkyl amines such as ethylenediamine and diethylenetriamine.

In general, the precursor salts useful for forming the catalysts of this invention may be prepared by mixing an aqueous solution of ammonium molybdate and/or tungstate with an aqueous solution of the chelated promoter metal cation [ML]$^{2+}$ which, in the presence of excess metallate, ligand and/or chelated promoter metal cation, will result in the formation of the precursor salt as a precipitate which is readily recovered. The chelating promoter cation is easily formed by, for example, mixing an aqueous solution of one or more water soluble promoter metal salts with the ligand. The water soluble salt may be any water soluble salt that is convenient to use such as a halide, sulfate, perchlorate, acetate, nitrate, etc. Alternatively, an aqueous solution of ammonium molybdate and/or tungstate may be mixed with the ligand with the resulting solution mixed with an aqueous solution of promoter metal salt or the salt can vary considerably depending on the nature of the hydrocarbon being hydrotreating, the nature of the impurities or contaminants to be reacted to removed, and, inter alia, the extent of conversion desired, if any. In general however, the following are typical conditions for hydrotreating a naphtha boiling within a range of from about 25° C. to about 210° C., a diesel fuel boiling within a range of from about 170° C. to 350° C., a heavy gas oil boiling within a range of from about 325° C. to about 475° C., a lube oil feed boiling within a range of from about 290°–550° C., or residuum containing from about 10 percent to about 50 percent of material boiling above about 575° C.

| Feed | | Temp., °C. | Pressure psig | Space Velocity V/V/Hr | Hydrogen Gas Rate SCF/B |
|---|---|---|---|---|---|
| Naptha | Typical | 100–370 | 150–800 | 0.5–10 | 100–2000 |
| Diesel Fuel | Typical | 200–400 | 250–1500 | 0.5–4 | 500–6000 |
| Heavy Gas Oil | Typical | 260–430 | 250–2500 | 0.3–2 | 1000–6000 |
| Lube Oil | Typical | 200–450 | 100–3,000 | 0.2–5 | 100–10,000 |
| Residuum | Typical | 340–450 | 1000–5000 | 0.1–1 | 2000–10,000 | be added to the ligand and dissolved into the solution of molybdate and/or tungstate. The catalyst precursor preparation will be further understood by reference to the Examples, infra.

The catalysts useful in the process of this invention may be used in bulk or supported on a suitable support, preferably supported on a suitable inorganic refractory oxide support such as alumina. As previously stated, an advantage of the catalyst precursors useful in this invention resides in their water solubility which permits them to be supported on suitable support materials by techniques well-known in the art, such as impregnation, incipient wetness and the like, the choice being left to the convenience of the practitioner. When using the impregnation technique, the aqueous impregnating solution will be contacted with the support for a time sufficient to deposit the precursor material onto the support either by selective adsorption or alternatively, the excess water may be evaporated during drying, leaving behind the precursor salt. Advantageously, the incipient wetness techniques may be used whereby just enough of an aqueous precursor salt solution is added to dampen and fill the pores of the support.

The catalysts of this invention may be prepared by heating one or more catalyst precursor salts, bulk or supported, in the presence of sulfur in a non-oxidizing atmosphere, at a temperature of at least about 200° C. for a time sufficient to form the catalyst. Preferably the sulfur required during the formation of the catalyst be present in the form of sulfur bearing compound and in an amount in excess of that required to form the catalyst. Thus, it is preferred that the catalyst be formed by heating the precursor in the presence of sulfur or, preferably in the presence of a sulfur bearing compound which can be one or more solids, liquids, gases or mixtures thereof. Thus, the catalyst will be formed by heating the precursor in the presence of sulfur or a sulfur bearing compound. Mixtures of hydrogen and H$_2$S have been found to be particularly suitable. Preferably the temperature will range between from about 250°–600° C., more preferably from about 250°–500° C. and still more preferably from about 300°–400° C. The non-oxidizing atmosphere may be inert or net reducing.

As discussed under Background of the Disclosure, molybdenum and tungsten sulfide catalysts have many uses, including hydrotreating. Hydrotreating conditions The invention will be further understood by reference to the following examples.

EXAMPLES

Catalyst Precursor Preparation

A tris(ethylenediamine) nickel molybdate Ni(en)$_3$MoO$_4$ catalyst precursor was prepared by dissolving ammonium molybdate into ethylenediamine (en) and the resulting solution cooled to 0° C. in an ice bath. An aqueous solution of nickel chloride was slowly added, in aliquots, to the above solution, with agitation after the addition of each aliquot. A precipitate was formed and recovered by vacuum filtration. This precipitate was Ni (en)$_3$MoO$_4$ and was washed with distilled water and acetone and then dried in a vacuum oven at 50° C. for three hours. The resulting cake was screened, pelletized, sized to 20/40 mesh (Tyler). More specifically, 20.5 gm of (NH$_4$)$_6$Mo$_7$O$_{24}$.4H$_2$O (ammonium heptamolybdate) was added to 500 ml of ethylene-diamine (en) in a 250 ml Erlenmeyer flask. This amount of en was in excess of that stoichiometrically required to form the precursor and the excess aided in precipitating same from solution. From 40 to 50cc of distilled H$_2$O was used twice to wash off any solid or solution remaining on the sides of the flask. The resulting solution was cooled to 0° C. in an ice bath and kept in the bath for the duration of the preparation. In a separate flask 27 gm of NiCl$_2$.6H$_2$O were dissolved into 300 ml of distilled H$_2$O. This Ni$^{2+}$ solution was added slowly, in aliquots, to the (NH$_4$)$_2$MoO$_4$/en aqueous solution with agitation after each addition. A precipitate formed immediately. This precipitate was separated out by vacuum filtration through a Buchner funnel. The product, Ni(en)$_3$MoO$_4$, was washed with distilled H$_2$O, then with ethanol, and dried under vacuum for 16–24 hrs. 46.0 gm of Ni(en)$_3$MoO$_4$ were recovered.

This same procedure was used for the preparation of Co(en)$_3$MoO$_4$, except that an appropriate amount of CoCl$_2$.6H$_2$O was used instead of NiCl$_2$.6H$_2$O.

To form a supported catalyst, 43 grams of Co(en)$_3$MoO$_4$ were dissolved into 140 cc of distilled water. Sixty grams of a reforming grade of $\gamma$-Al$_2$O$_3$ (Englehard Industries), which had been calcined overnight at 500° C., were impregnated with this solution via the incipient wetness technique using four successive aliquots. After each aliquot was added to the alumina support, the impregnate was dried under vacuum at about 100° C. for six hours. The final impregnate was ground and pelletized using a 4% aqueous solution of polyvinyl alcohol as a binder. The bulk $Ni(en)_3MoO_4$ was also pelletized using the same technique. Finally, another sample of $Co(en)_3MoO_4$ was prepared and pelletized as above in bulk.

The pelletized catalyst precursors were placed into a stainless steel reactor at 100° C. at atmospheric pressure where they were purged for one hour under nitrogen. Ten percent of hydrogen sulfide in hydrogen was introduced into the reactor at a space velocity of 0.75 SCF/hr for each 10 cc of catalyst in the reactor. The temperature in the reactor was then raised to 325°–350° C. and kept at this temperature for one to three hours to form the catalyst after which the temperature in the reactor was lowered to 100° C., the $H_2S/H_2$ gas flow was stopped and the reactor was purged with nitrogen until room temperature was reached.

Reaction Conditions

At least about 20 cc of each catalyst was loaded into a stainless steel fixed-bed reactor. The conditions in the reactor were as set forth below:
Temperature: 325° C.
Pressure: 3.15 MPa
Hydrogen rate: 3000 SCF/bbl
LHSV: 2, 3 and 4 V/V/Hr.
The liquid product was analyzed for sulfur by X-ray fluorescence and for nitrogen by combustion analysis. The feedstock used was a light catalytic cycle oil (LCCO) that was about 20 wt. % paraffinic having properties set forth in Table 1.

In all of these experiments, the results obtained from the catalysts of this invention were compared to results obtained for commercial HDS and HDN catalysts comprising cobalt molybdate on $\gamma$-$Al_2O_3$ and nickel molybdate on $\gamma$-$Al_2O_3$, respectively. The cobalt molybdate comprised 12.5 percent molybdenum oxide and 3.5 percent cobalt oxide supported on the gamma alumina and the nickel molybdate comprised 18 percent molybdenum oxide and 3.5 percent nickel oxide on gamma alumina. These commercial catalysts were sulfided employing the same procedure used to form the catalysts of this invention, except that the temperature was 360° C. for one hour.

EXAMPLE 1

In this experiment, the LCCO feed was hydrotreated at an LHSV of 2 comparing two of the catalysts of this invention to the commercial cobalt molybdate on alumina HDS catalyst. The results are set forth in Table 2.

EXAMPLE 2

This experiment was the same as in Example 1 except that the LHSV was 3. The results are shown in Table 3.

EXAMPLE 3

In this experiment, the unsupported catalyst of this invention prepared from the $Co(en)_3MoO_4$ was compared to the commercial HDN catalyst, the results of which are shown in Table 4. These results show the remarkable HDN selectivity for the catalyst of this invention. The liquid hourly space velocity (LHSV) used in this invention was 4.

TABLE 1

| LCCO Feed | |
|---|---|
| Gravity (°API) | 18.6 |
| Sulfur, wt. % | 1.5 |
| Nitrogen, ppm | 370 |

| GC distillation | |
|---|---|
| Wt. % | Temp., °C. |
| 5 | 231 |
| 10 | 251 |
| 50 | 293 |
| 70 | 321 |
| 90 | 352 |
| 95 | 364 |

TABLE 2

| | % HDN | % HDS |
|---|---|---|
| Catalyst | | |
| cobalt molybdate on $\gamma$-$Al_2O_3$ | 25.5 | 87.4 |
| Catalyst Precursor | | |
| $Ni(en)_3MoO_4$ | 83.0 | 86.8 |
| $Co(en)_3MoO_4$ supported on $\gamma$-$Al_2O_3$ | 40.3 | 90.9 |

TABLE 3

| | % HDN | % HDS |
|---|---|---|
| Catalyst | | |
| cobalt molybdate on $\gamma$-$Al_2O_3$ | 19.0 | 83.6 |
| Catalyst Precursor | | |
| $Ni(en)_3MoO_4$ | 69.6 | 80.2 |
| $Co(en)_3MoO_4$ supported on $\gamma$-$Al_2O_3$ | 25.5 | 85.1 |

TABLE 4

| | % HDN | % HDS |
|---|---|---|
| Catalyst | | |
| cobalt molybdate on $\gamma$-$Al_2O_3$ | 12.8 | 81.0 |
| Catalyst Precursor | | |
| $Co(en)_3MoO_4$ | 82.4 | 87.6 |

EXAMPLE 4

In this experiment, the LCCO feed was hydro-treated at LHSV ranging from 1 to 6 with a catalyst prepared by impregnating a chromia on alumina support material with a Ni $(en)_3MoO_4$ salt.

The Ni $(en)_3MoO_4$ salt was prepared by dissolving 40.6 g of ammonium paramolybdate in a mixture of 900 ml ethylenediamine (en) and 100 ml in a 2 liter round bottom, three-neck flask. Next, 56 g of nickel chloride was dissolved in 100 ml $H_2O$ and transferred to a dropping funnel. While vigorously stirring the molybdate solution with an air driver stirrer, the nickel chloride solution was added to the flask via the dropping funnel. A violet powder precipitated. This precipitate was filtered, washed with acetone and then vacuum dried at 50° C. 94.6 gms of product was obtained (calculated yield=94 g).

50 g of 19% $Cr_2O_3$ on $Al_2O_3$ in the form of ⅛ "pellets (Alfa Products Div. Morton Thiokol, Inc.) were calcined at 500° C. for 3 hrs and, after cooling, crushed to a −20+40 mesh powder. This powder was then placed into a 500 ml ROTOVAC flask. 45.8 g of the Ni $(en)_3MoO_4$ were dissolved in 120 ml of water and added to the flask. The flask was evacuated and rotated in a 70° C. water bath until the water was completely removed. The final impregnated solid weighed 104.6 gms.

This impregnate was then ground, pelletized and sulfided at 360° C. for one hour following the procedure for examples 1-3. This catalyst gave a % HDS of 70.5 and % HDN of 56.6 when tested with the LCCO feed at 325° C., 3.15 MPa and 3,000 SCF of hydrogen per bbl of oil an an LHSV of 3.0.

EXAMPLE 5

25 grams of MgO in 20-40 mesh size were impregnated with 87.2 cc of solution containing 30.7 grams of Ni (en)$_3$MoO$_4$. The resulting impregnate was vacuum dried at 50° C. overnight. The final impregnated solids weighed 61.6 grams.

The final catalyst was sulfided at 400° C. for one hour with a 10% H$_2$S in hydrogen mixture, following the procedure for Examples 1-3.

This catalyst gave a % HDS of 58.1 and % HDN of 31.3 when tested with the LCCO feed at 325° C., 3.15 MPa and 3,000 SCF of hydrogen per bbl of oil at an LHSV of 3.0.

What is claimed is:

1. A hydroprocessing process comprising contacting a hydrocarbon feed at elevated temperature of at least about 100° C. and in the presence of hydrogen with a supported, self-promoted catalyst obtained by compositing one or more catalyst precursors of the formula (ML) (Mo$_y$W$_{1-y}$O$_4$) with an inorganic refractory oxide support and heating said composition in a non-oxidizing atmosphere in the presence of sulfur at elevated temperature for a time sufficient to form said catalyst, wherein M comprises one or more divalent promoter metals, wherein y is any value ranging from 0 to 1, and wherein L is one or more, neutral, nitrogen-containing ligands at least one of which is a chelating polydentate ligand, said contacting occuring for a time sufficient to convert at least a portion of said feed.

2. The process of claim 1 wherein said sulfur is in the form of one or more sulfur bearing compounds.

3. The process of claim 2 wherein promoter metal M comprises one or more divalent promoter metals selected from the group consisting of Fe, Ni, Co, Zn, Cu, Mn and mixtures therof.

4. The process of claim 3 wherein M is selected from the group consisting of (a) Fe, Ni, Co, and mixtures thereof and (b) mixtures of (a) with Zn, Cu, Mn and mixtures thereof.

5. The process of any of claims 2, 3 or 4 wherein ligand L is selected from the group consisting of alkyl amines, aryl amines, nitrogen heterocycles and mixtures thereof.

6. The process of claim 5 wherein said catalyst is formed at a temperature of at least about 200° C.

7. The process of claim 6 wherein said ligand L has a total denticity of six.

8. The process of claim 7 wherein L is one or more chelating polydentate amines.

9. The process of claim 8 wherein L is one or more alkyl amines.

10. The process of claim 9 wherein L is two tridentate or three bidentate amines.

11. The process of claim 10 wherein said non-oxidizing atmosphere comprises a mixture of H$_2$ and H$_2$S.

12. A hydroprocessing process comprising contacting a hydrocarbon feed at elevated temperature of at least about 200° C. and in the presence of hydrogen with a self-promoted catalyst supported on an inorganic refractory oxide support for a time sufficient to convert at least a portion of said feed wherein said catalyst is formed by:

(i) compositing a porous, inorganic refractory oxide support with a water soluble catalyst precursor salt characterized by the formula (ML) (Mo$_y$W$_{1-y}$O$_4$) wherein M comprises one or more divalent promoter metals selected from the group consisting of Mn, Fe, Co, Ni, Cu, Zn and mixtures thereof, wherein y is any value ranging from 0 to 1, and wherein L is one or more neutral, nitrogen-containing ligands at least one of which is a chelating polydentate ligand; and (ii) heating said composite formed in (i) in a non-oxidizing atmosphere in the presence of excess sulfur in the form of one or more sulfur bearing compounds and at a temperature of at least about 200° C. to form said self-promoted catalyst.

13. The process of claim 12 wherein said promoter metal M comprises at least one metal selected from the group consisting of (a) Fe, Co, Ni and mixtures thereof and (b) mixtures of (a) with Zn, Cu, Mn and mixtures thereof.

14. The process of claim 13 wherein said support comprises alumina.

15. The process of either of claims 13 or 14 wherein L has a total denticity of six and is one or more chelating, polydentate alkyl amines.

* * * * *